United States Patent
Cesarano

(10) Patent No.: US 10,678,269 B2
(45) Date of Patent: Jun. 9, 2020

(54) UNMANNED VEHICLE, SYSTEM AND METHOD FOR TRANSMITTING SIGNALS

(71) Applicant: PROXY TECHNOLOGIES, INC., Reston, VA (US)

(72) Inventor: Patrick C. Cesarano, Washington, DC (US)

(73) Assignee: PROXY TECHNOLOGIES, INC., Reston, VA (US)

(*) Notice: Subject to any disclaimer, the term of this patent is extended or adjusted under 35 U.S.C. 154(b) by 282 days.

(21) Appl. No.: 15/637,978

(22) Filed: Jun. 29, 2017

(65) Prior Publication Data

US 2017/0302364 A1 Oct. 19, 2017

Related U.S. Application Data

(63) Continuation of application No. 15/092,576, filed on Apr. 6, 2016, now Pat. No. 9,711,851.

(Continued)

(51) Int. Cl.
*G05D 1/10* (2006.01)
*H01Q 3/28* (2006.01)
(Continued)

(52) U.S. Cl.
CPC ............ *G05D 1/104* (2013.01); *B64C 39/024* (2013.01); *G01S 7/006* (2013.01); *G01S 13/02* (2013.01);
(Continued)

(58) Field of Classification Search
CPC .... H04B 7/0617; H04B 7/18506; H01Q 3/28; H01Q 3/30; H01Q 3/2617; H01Q 3/26; H01Q 3/36; G05D 1/104; G05D 1/0094; G05D 2201/0207; G05D 1/0088; G05D 1/0246; G05D 1/0202; G05D 1/02; G05D 1/0022; G05D 1/0027; G05B 13/024; G08G 9/02; G08G 5/045; G01S 7/006; G01S 13/02; G01S 13/06; G01S 2013/0254; G01S 19/13; G06K 9/00637; B64C 2201/024;
(Continued)

(56) References Cited

U.S. PATENT DOCUMENTS 6,513,758 B1 * 2/2003 Lloyd ................ H01Q 1/28
244/129.1
7,777,674 B1 * 8/2010 Haddadin ............ H01Q 1/28
342/368

(Continued)

*Primary Examiner* — Peter D Nolan
(74) *Attorney, Agent, or Firm* — Kenealy Vaidya LLP

(57) ABSTRACT

Some embodiments are directed to an unmanned vehicle for transmitting signals. The unmanned vehicle includes a transmitting unit that is configured to transmit a signal towards an object. The unmanned vehicle also includes a control unit that is in communication with at least one companion unmanned vehicle. The control unit is configured to determine a position of the at least one companion unmanned vehicle relative to the unmanned vehicle. The control unit is further configured to control the transmitting element based on at least the position of the at least one unmanned vehicle such that the transmitting element forms a phased-array transmitter with a transmitting element of the at least one companion unnamed vehicle, the phased-array transmitter emitting a transmission beam in a predetermined direction.

9 Claims, 7 Drawing Sheets

Related U.S. Application Data

(60) Provisional application No. 62/291,344, filed on Feb. 4, 2016.

(51) Int. Cl.
| | |
|---|---|
| *G06K 9/00* | (2006.01) |
| *G05D 1/00* | (2006.01) |
| *G01S 13/02* | (2006.01) |
| *H01Q 3/26* | (2006.01) |
| *G01S 7/00* | (2006.01) |
| *G05D 1/02* | (2020.01) |
| *B64C 39/02* | (2006.01) |
| *G01S 19/13* | (2010.01) |
| *G08G 5/04* | (2006.01) |
| *G08G 9/02* | (2006.01) |
| *G05B 13/02* | (2006.01) |
| *H01Q 3/36* | (2006.01) |
| *H04B 7/06* | (2006.01) |
| *H04B 7/185* | (2006.01) |
| *G01S 13/06* | (2006.01) |

(52) U.S. Cl.
CPC ............ *G01S 19/13* (2013.01); *G05B 13/024* (2013.01); *G05D 1/0022* (2013.01); *G05D 1/0027* (2013.01); *G05D 1/0088* (2013.01); *G05D 1/0094* (2013.01); *G05D 1/02* (2013.01); *G05D 1/0202* (2013.01); *G05D 1/0246* (2013.01); *G06K 9/00637* (2013.01); *G08G 5/045* (2013.01); *G08G 9/02* (2013.01); *H01Q 3/26* (2013.01); *H01Q 3/2617* (2013.01); *H01Q 3/28* (2013.01); *H01Q 3/36* (2013.01); *H04B 7/0617* (2013.01); *H04B 7/18506* (2013.01); *B64C 2201/021* (2013.01); *B64C 2201/024* (2013.01); *B64C 2201/141* (2013.01); *B64C 2201/143* (2013.01); *B64C 2201/146* (2013.01); *G01S 13/06* (2013.01); *G01S 2013/0254* (2013.01); *G05D 2201/0207* (2013.01)

(58) Field of Classification Search
CPC ........ B64C 2201/021; B64C 2201/146; B64C 2201/143; B64C 2201/141; B64C 39/024
See application file for complete search history.

(56) References Cited

U.S. PATENT DOCUMENTS

| | | | |
|---|---|---|---|
| 9,479,964 B2* | 10/2016 | Jalali | H04L 5/006 |
| 2015/0237569 A1* | 8/2015 | Jalali | H04W 84/06 |
| | | | 370/326 |
| 2016/0112116 A1* | 4/2016 | Jalali | H04W 16/28 |
| | | | 370/252 |
| 2017/0085307 A1* | 3/2017 | Yazdani | H04B 7/0617 |
| 2017/0126309 A1* | 5/2017 | Rupasinghe | H04B 7/18506 |

* cited by examiner

UNMANNED VEHICLE, SYSTEM AND METHOD FOR TRANSMITTING SIGNALS

CROSS REFERENCE TO RELATED APPLICATION

This application is a continuation of U.S. patent application Ser. No. 15/092,576 filed on Apr. 6, 2017, which claims the priority benefit under 35 U.S.C. § 119 of U.S. Provisional Application No. 62/291,344 filed Feb. 4, 2016, the contents of which are hereby incorporated in their entireties by reference.

BACKGROUND

The disclosed subject matter relates to systems and methods for transmitting signals. More particularly, the disclosed subject matter relates to unmanned vehicles and systems, methods for transmitting and receiving signals, and methods for transmitting and receiving signals using a swarm of unmanned vehicles.

Various known devices are used for transmitting signals towards a target and receiving reflected signals from the target. The reflected signals can be analyzed to determine various parameters related to the target. In order to obtain accurate results, the transmitted signals are often directed towards the target. Beamforming is a known technique to obtain a desired spatial orientation or focus of the transmitted signals. Beamforming generally utilizes an array of transmitting antennas to cause constructive interference of phased and/or amplitude modulated waves in a desired direction, while causing destructive interference in other directions. Known applications of beamforming include, but not restricted to, RADAR, SONAR, seismology, wireless communications, and so forth. Beamforming also includes detection of reflected signals at a sensor array by various techniques, such as spatial filtering and interference rejection. The transmitting antenna array and the sensor array are typically integral parts of a single device. As a result, the transmitted signals may interfere with the received signals, and decrease Signal-to-Noise Ratio (SNR) of the signal detection scheme.

SUMMARY

Beamforming is a technique to obtain a directional radiation pattern for detection, tracking and analyses of target objects or regions. Known devices that use beamforming include a transmitting antenna array for transmitting a beam in a desired direction and a receiving antenna array for detecting reflected signals. A high Signal-to-Noise Ratio (SNR) is desired to achieve accurate transmission of radiative signals and also to achieve accurate detection of signals at the receiving antenna array. However, atmospheric noise can reduce the accuracy of each of these processes. Various methods are suggested by related art to shield the receiving antenna array from atmospheric noise and increase the accuracy of the signal detection scheme.

The transmitting antenna array is typically located in close proximity to the receiving antenna array in the aforementioned systems. Therefore, the receiving antenna array can directly pick up a portion of the transmitted beam before the transmitted beam has interacted with a given target. This can cause a decrease in the SNL of the detection device/array. Since the transmitting and receiving antenna(s) are integral parts of the system, interference due to transmitted beams cannot be ignored.

Moreover, the system and the target can be separated by a large distance that may also reduce the accuracy of signal detection. The target can also be situated in a location that can be difficult to access and hinder placement of the system at a suitable distance. Moreover, the target can be surrounded by various natural or artificial obstacles (for example, buildings, mountains etc.) that may further reduce the accuracy of signal detection.

It may therefore be beneficial to provide an unmanned vehicle, a system, and a method of use thereof, that address at least one of the above issues. For example, it may be beneficial to use two or more unmanned vehicles to implement beamforming techniques to detect, track and/or analyze various targets, or even to coordinate and relay communications, or provide various means of military deterrence.

It may also be beneficial to use a swarm of two or more unmanned vehicles that allow arbitrary separation between transmitting and receiving elements to reduce the level of transmitted signals received at the signal detection elements. The swarm of unmanned vehicles can also be positioned at suitable distances from the target to enable high accuracy of signal detection. It may also be beneficial to use unmanned aerial vehicles that can fly over obstacles and implement beamforming techniques to achieve accurate signal transmission and detection.

Some embodiments are directed to an unmanned vehicle for transmitting signals. The unmanned vehicle includes a transmitting element that is configured to transmit a signal towards an object. The unmanned vehicle also includes a control unit that is in communication with at least one companion unmanned vehicle. The control unit is configured to determine a position of the at least one unmanned companion vehicle relative to the unmanned vehicle, and control the transmitting element based on at least the position of the at least one unmanned vehicle such that the transmitting element forms a phased-array transmitter with a transmitting element of the at least one companion unmanned vehicle, the phased-array transmitter emitting a transmission beam in a predetermined direction.

Some other embodiments are directed to a system for transmitting and receiving signals. The system includes a plurality of transmitting unmanned vehicles spaced from each other, each of the plurality of transmitting unmanned vehicles including a transmitting element that is configured to transmit a signal towards an object, the transmitting elements of the plurality of transmitting unmanned vehicles together forming a phased-array transmitter that emits a transmission beam in a predetermined direction. The system also includes at least one receiving unmanned vehicle including a receiving element that is configured to receive a reflected signal from the object, and a control unit that is in communication with the plurality of transmitting unmanned vehicles, wherein the control unit is configured to position the at least one receiving unmanned vehicle such that the receiving element is spatially clear of a path of the transmission beam.

Yet some other embodiments are directed to method of controlling a plurality of unmanned vehicles. The method includes receiving a control signal indicative of a predetermined direction; determining positions of the plurality of unmanned vehicles relative to each other; regulating transmitting elements of the plurality of unmanned vehicles to together form a phased-array transmitter based on at least the positions of the plurality of unmanned vehicles; and emitting a transmission beam in a predetermined direction using the phased-array transmitter.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. System of Unmanned Vehicles

Figure 1:
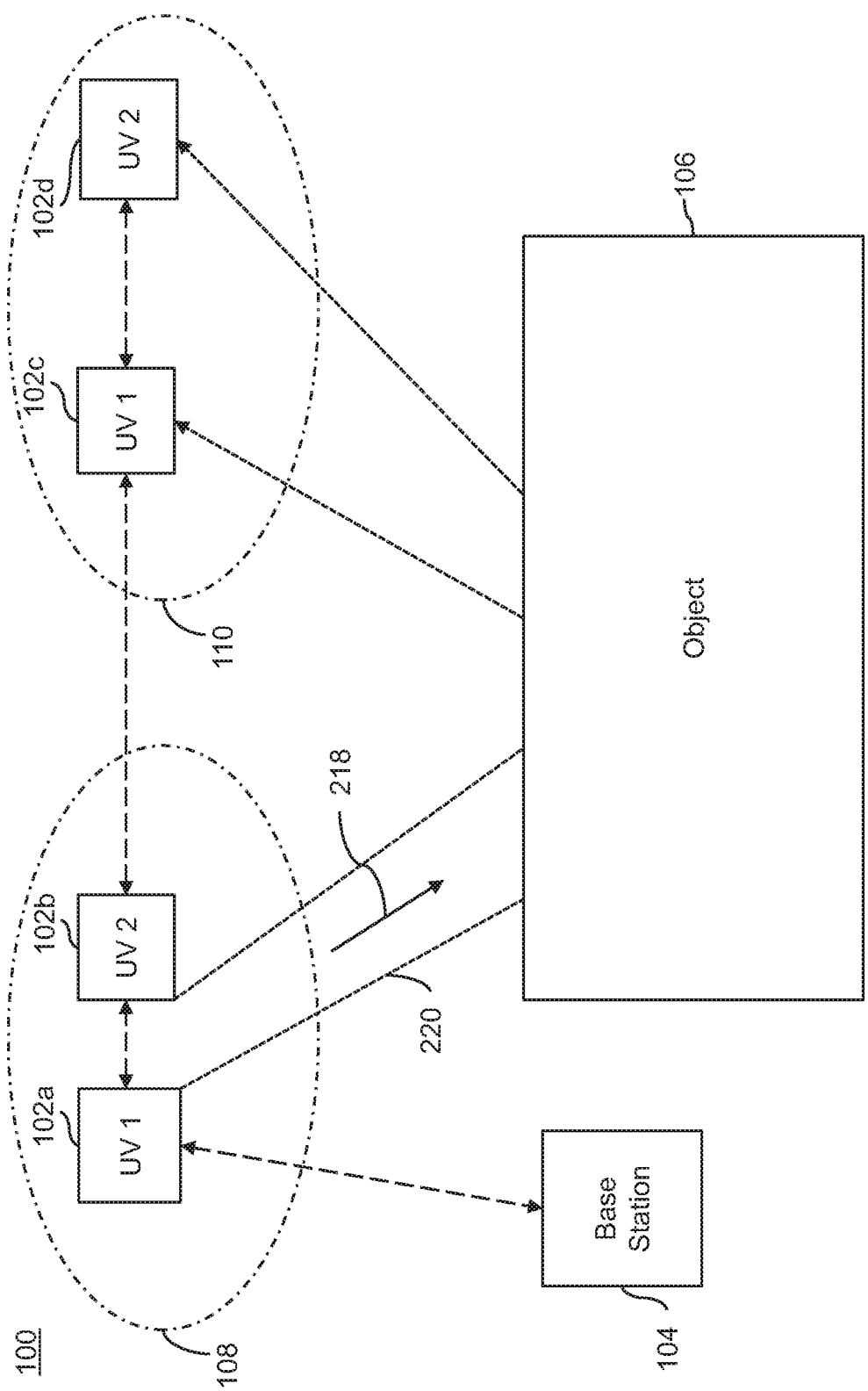
FIG. 1 is a schematic of a system of unmanned vehicles in accordance with the disclosed subject matter.

FIG. 1 is a schematic of an exemplary system 100 for transmitting and receiving signals in accordance with the disclosed subject matter. The system 100 includes unmanned vehicles 102a, 102b, 102c, and 102d, hereinafter collectively referred to as an unmanned vehicle 102. However, four unmanned vehicles 102 shown in the exemplary embodiment is for illustration purposes only, and the various embodiments are intended to include or otherwise cover any number of unmanned vehicles that may be beneficial.

The unmanned vehicles 102 can be, for example, an unmanned aerial vehicle, an unmanned terrestrial vehicle, an unmanned underwater vehicle, an unmanned spacecraft, or any other type of unmanned vehicle. In fact, embodiments are intended to include or otherwise cover any type of unmanned vehicle that may be beneficial. In some embodiments, the system 100 can also have different types of unmanned vehicles cooperate with each other.

The unmanned vehicles 102 are capable of controlled movement in any of one through three dimensions. Therefore, a distance and/or relative orientation between each of the unmanned vehicles 102 can be varied. Each of the unmanned vehicles 102 can have a power source to provide power for propulsion and various other equipment. The power source can be, for example, a battery, fuel cells, photovoltaic cells, solar energy, a combustion engine, a nuclear reactor, or any combination thereof. In fact, embodiments are intended to include or otherwise cover any type of power source to provide power to the unmanned vehicle for its operations.

The unmanned vehicles 102 can also have one or more rotors, propellers, rudders, wings, or other control surfaces that allow the unmanned vehicles 102 to control movements and/or orientation.

The unmanned vehicles 102 are capable of communicating with each other. In certain embodiments, the unmanned vehicles 102 are capable of communicating with each other through a communication network such as a wireless network. The wireless network can include, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In some embodiments, the communication network may include or otherwise cover networks or subnetworks, each of which may include, for example, a wired or wireless data pathway. Examples of the communication network may include, but are not limited to, a Personal Area Network (PAN), a Storage Area Network (SAN), a Home Area Network (HAN), a Campus Area Network (CAN), a Virtual Private Network (VPN), an Enterprise Private Network (EPN), Internet, a Global Area Network (GAN), and so forth. Embodiments are intended to include or otherwise cover any type of communication network, including known, related art, and/or later developed technologies.

Further, at least one of the unmanned vehicles 102 is selected to act as a control platform of the system 100. The control platform can communicate with a base station 104 on behalf of the other unmanned vehicles 102, or each unmanned vehicle 102 may independently perform their own communication with base station 104. In the former example, the control platform unmanned vehicle 102 may distribute required signals from the system 100 among the other unmanned vehicles 102. The base station 104 may be a fixed station or a mobile station. Examples of a mobile station include an aerial vehicle, a terrestrial vehicle, a ship, a submarine, and the like. It may also be contemplated that the base station 104 may be, but is not restricted to, a portable device, such as a smartphone, a laptop, a remote control device, a wearable device and the like.

The control platform can also control a collective behavior of the unmanned vehicles 102 such that the unmanned vehicles 102 act as an autonomous vehicle swarm. The control platform can be chosen based on one or more parameters, such as a distance between the base station 104 and the corresponding unmanned vehicles 102, distances between the unmanned vehicles 102 etc. In the exemplary embodiment shown in FIG. 1, the unmanned vehicle 102a is selected as the control platform as the unmanned vehicle 102a is nearest to the base station 104. The unmanned vehicles 102b, 102c and 102d, therefore, act as companion unmanned vehicles of the unmanned vehicle 102a.

In alternative embodiments, instead of one of the unmanned vehicles 102, the base station 104 acts as the central platform and collectively controls the unmanned vehicles 102 to form a vehicle swarm. In yet another embodiment, each of the unmanned vehicles 102 may independently communicate with the base station 104. In an embodiment, the unmanned vehicles 102 can be manually controlled by an operator present in the base station 104. In another embodiment, the unmanned vehicles 102 can be autonomously controlled based on a predetermined control strategy. In a further embodiment, the unmanned vehicles 102 can be semi-autonomously controlled which involves the operator entering and/or selecting parameters and subsequent autonomous control of the unmanned vehicles 102 based on the entered and/or selected parameters.

In the exemplary embodiment shown in FIG. 1, the unmanned vehicles 102a and 102b form a first group 108 of transmitting unmanned vehicles and transmit signals towards an object 106. The object 106 can be stationary or mobile. The object 106 can also be, but is not restricted to, a geographic feature, an artificial installation, an antenna or base station, an adversarial objective, or a portion of the terrain or atmosphere. Further, the unmanned vehicles 102c and 102d form a second group 110 of receiving unmanned vehicles and receive signals from the object 106. In an embodiment, each of the unmanned vehicles 102 can selectively transmit and receive signals. Therefore, any one or more of the unmanned vehicles 102 may be selected as transmitting unmanned vehicles or receiving unmanned vehicles based on requirements. In yet another embodiment, one or more of the unmanned vehicles 102 can act as both transmitting receiving unmanned vehicles, and transmit to and receive signals from the object 106.

Figure 2:
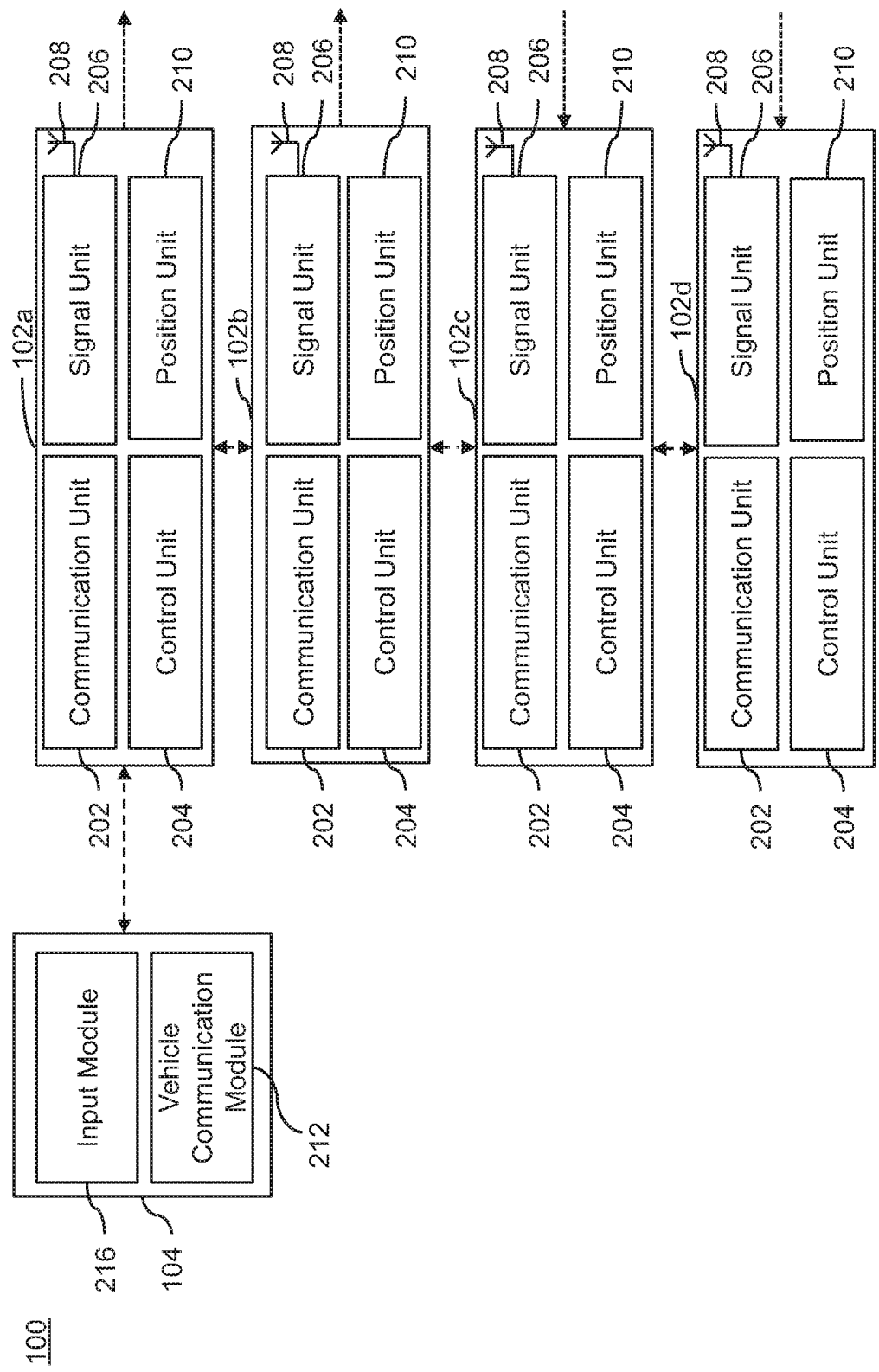
FIG. 2 illustrates components of the unmanned aerial vehicles in accordance with an embodiment of the disclosed subject matter.

FIG. 2 is a block diagram of the system 100 of unmanned vehicles 102 in accordance with an exemplary embodiment of the disclosed subject matter. Each of the unmanned vehicles 102 includes, but is not restricted to, a communication unit 202, a control unit 204, a signal unit 206, an antenna 208, and a position unit 210. In fact, embodiments of the disclosed subject matter are intended to include any number of components.

Further, each of the unmanned vehicles 102 can include various sensors, such as, but is not restricted to, an altimeter, a compass, cameras, temperature sensors, and so forth. The unmanned vehicles 102 can also include one or more weapon systems or payloads.

The base station 104 includes a vehicle communication module 212 and an input module 216. In some embodiments, the base station 104 can include multiple vehicle communication modules 212 and input modules 216. The vehicle communication module 212 can communicate with one or more unmanned vehicles 102.

The input module 216 can be configured to receive various inputs, such as one or more instructions to be communicated to one or more unmanned vehicles 102 and/or information regarding the object 106. The input module 216 can be configured to enable the operator to remotely control the unmanned vehicles 102. The input module 216 can be configured to receive inputs from various sources, such as a voice recognition module, a keyboard, a touchscreen, a joystick, and the like. Apart from receiving inputs from the operator, the input module 216 can also be configured to receive autonomously generated inputs from another controller (not shown).

The base station 104 can also include additional modules, such as a Graphical User Interface (GUI) (not shown), a power source, control and processing circuitry etc. The GUI may enable the operator to monitor the unmanned vehicles 102 in real time.

The communication unit 202 of one of the unmanned vehicles 102 can be configured to communicate with communication units 202 of the other unmanned vehicles 102 and the vehicle communication module 212 of the base station 104. The communication unit 202 and the vehicle communication module 212 can wirelessly communicate with another device. In an embodiment, the communication unit 202 and the vehicle communication module 212 may communicate by radio waves. Information may be encoded in radio waves by various methods, such as, but is not restricted to, frequency modulation, amplitude modulation, and the like. Further, a first radio communication channel may be used for communication between the communication units 202 of the unmanned vehicles 102, while a second radio communication channel may be used for communication between the communication units 202 of the unmanned vehicles 102 and the vehicle communication module 212 of the base station 106.

In an embodiment, instead of radio waves, the communication unit 202 may communicate with the other communication units 202 and the vehicle communication module 212 via a wireless network. The wireless network can be a cellular network, a Wide Area Network (WAN), a satellite based network, Internet, or a combination thereof. Other embodiments can include optical or even sonic communication.

The control unit 204 controls various operations of the unmanned vehicle 102 including, but not limited to, movement of the unmanned vehicle 102, controlling and coordinating operations of various components of the unmanned vehicle 102, interfacing with other unmanned vehicles 102 and processing information from the base station 104. The control unit 204 may include various parts, such as a processor (not shown), a memory (not shown), and input/output interfaces (not shown). In alternative embodiments, the control unit 204 can include multiple processors and multiple memory units. The memory can store one or more instructions, lookup tables, databases, and the like required for controlling the various operations of the unmanned vehicle 102. The input/output interfaces may interface the control unit 204 with other components of the unmanned vehicle 102, such as the communication unit 202, the signal unit 206 and the position unit 210. The processor can receive data from the other components of the unmanned vehicle 102 via the input/output interfaces, and perform multiple operations on the data based on the instructions, lookup tables and databases stored in the memory.

Referring to FIGS. 1 and 2, the signal unit 206 can be configured to selectively transmit and receive signals via the antenna 208. The signal unit 206 can change a frequency, a phase and an amplitude of the signals transmitted or received by the antenna 208. The signal unit 206 may include multiple circuit elements for carrying out signal processing operations, for example, one or more filters, oscillators, transducers etc. Further, the antenna 208 may assume different forms including, but not restricted to, horns, dipoles, monopoles, dishes, and the like. In fact, embodiments of the disclosed subject matter are intended or otherwise include any configuration of the antenna 208 that may be beneficial.

Though the embodiment shown in FIG. 2 illustrates each of the unmanned vehicles 102 as having one antenna 208, in an alternative embodiment, one or more of the unmanned vehicles 102 may include multiple antennas 208. Multiple antennas 208 can enable the unmanned vehicles 102 to simultaneously transmit and receive signals. In case of the unmanned vehicles 102a and 102b that form the first group 108 of transmitting unmanned vehicles, the signal unit 206 and the antenna 208 behave as a transmitter and a transmitting element, respectively. Therefore, the antennas 208 of the unmanned vehicles 102a and 102b transmit signals to the object 106. In case of the unmanned vehicles 102c and 102d that form the second group 110 of receiving unmanned vehicles, the signal unit 206 and the antenna 208 behave as a receiver and a receiving element, respectively. Therefore, the antennas 208 of the unmanned vehicles 102c and 102d receive signals from the object 106.

The position unit 210 can be configured to determine a position of the unmanned vehicle 102 relative to the other unmanned vehicles 102, the base station 104 and/or the object 106. The position of the unmanned vehicle 102 may include a distance as well as a relative orientation of the unmanned vehicle 102. The position unit 210 can be, but is not restricted to, a satellite based positioning system (e.g., Global Positioning System (GPS)), inertial measurement unit, laser based guidance systems, or a combination thereof. The position unit 210 can be configured to determine a global position of the unmanned vehicle 102 and determine relative positions based on signals received by the communication unit 202. The position unit 210 can also coordinate wireless phase locked loops (PLL's) to accomplish this task.

II. Deployment and Formation of the Unmanned Vehicles

An exemplary operation of the system 100 will be now described with reference to FIGS. 1 and 2. The unmanned vehicles 102 can be deployed from the base station 104 or any other suitable location. The unmanned vehicles 102 can also be independently deployed from multiple locations. After deployment, the unmanned vehicles 102 may communicate with each other to autonomously form the system 100. In another embodiment, the base station 104 can instruct each of the unmanned vehicles 102 to form the system 100. After the system 100 is formed, the central platform can be dynamically selected among the unmanned vehicles 102. As previously stated, the central platform is not mandatory as each unmanned vehicle 102 can independently communicate with the base station 104. Further, any one or more of the unmanned vehicles 102 can become a central platform. In the illustrated embodiment, the unmanned vehicle 102a acts as the central platform that communicates with the base station 104 on behalf of the other unmanned vehicles 102 and controls the collective behavior of the unmanned vehicles 102. However, in alternative embodiments, each of the unmanned vehicles 102 can autonomously control its operations and cooperate with other unmanned vehicles 102 without any central platform.

In some embodiments, the unmanned vehicles 102 may form an autonomous vehicle swarm upon deployment. Further, the unmanned vehicles 102 may autonomously arrange themselves into different types of formations for various purposes, including collision avoidance, energy conservation, safeguarding assets, ease of communication, tracking and analyses of objects, etc.

In an embodiment, the unmanned vehicles 102 can arrange themselves in an energy efficient formation in order to conserve energy during flight. In an exemplary scenario, an energy efficient formation is a V-formation in which the unmanned vehicles 102 form a substantially V-shaped arrangement. The unmanned vehicle 102 acting as the central platform may form the apex of the V-shape, or could be any other of the unmanned vehicles 102 in the formation. The V-formation may reduce an induced drag on the unmanned vehicles 102 which can ride on air currents of the preceding unmanned vehicles 102, thereby reducing energy consumption. A distance and/or angle between the unmanned vehicles may be dynamically changed based on ambient conditions to minimize energy consumption and/or to expand or contract based on a desired coverage area of an objective. Further, the unmanned vehicles 102 may periodically switch positions within the V-shape based on a remaining energy of each of the unmanned vehicles 102.

In another embodiment, the unmanned vehicles 102 can arrange themselves in a defensive formation to safeguard one or more assets. The assets can be an aircraft, a terrestrial vehicle, a ship, a stationary object (e.g., a communication tower or a building) etc. In alternate embodiments, the asset can be one or more of the unmanned vehicles 102 carrying a payload. The unmanned vehicles 102 in the defensive formation may use electronic countermeasures (e.g., jamming) and/or weapon systems to protect the asset. The defensive formation may be formed using various strategies, such as a Many-Protect-Few strategy. The Many-Protect-Few strategy may involve the protecting unmanned vehicles 102 substantially encircling the one or more assets and dynamically changing distances and relative orientations based on the detection of a threat.

In some embodiments, the unmanned vehicles 102 may arrange themselves in a formation based on various parameters, such as Signal-to-Noise Ratio (SNR), Signal-to-Interference Ratio (SIR), or other similar parameters at the receiving unmanned vehicles 102c and 102d. Specifically, the unmanned vehicles 102 may arrange themselves to improve Signal-to-Noise Ratio (SNR) when detecting, tracking and/or analyzing the object 106, as disclosed in more detail below.

III. Detection, Tracking and Analysis of Objects

In an embodiment, the unmanned vehicle 102a may receive a control signal indicative of a position of the object 106 from the base station 104. The unmanned vehicle 102a may then determine a predetermined direction 218 between the unmanned vehicle 102a and the object 106. In alternate embodiments, the base station 104 may determine the predetermined direction 218 based on the position of the unmanned vehicle 102a and the object 106, and communicate the predetermined direction 218 to the unmanned vehicle 102a. The unmanned vehicle 102a that is designated as the central platform, may communicate the predetermined direction 218 to the corresponding communication units 202 of the companion unmanned vehicles 102b, 102c and 102d. Further, the corresponding control units 204 of the companion unmanned vehicles 102b, 102b and 102c may then receive signals indicative of the predetermined direction 218.

The control units 202 also determines the position of the corresponding unmanned vehicles 102 based on signals received from the position unit 210. The communication unit 202 of the unmanned vehicle 102a can therefore receive signals from the companion unmanned vehicles 102b, 102c and 102d indicative of their respective positions. Therefore, the control unit 204 of the unmanned vehicle 102a can determine positions of all the companion unmanned vehicles 102b, 102c and 102d relative to itself. In some embodiments, this may be accomplished via one or more phase locked loops (PLL's) between the unmanned vehicles 102.

The control unit 204 of the unmanned vehicle 102a may then divide the unmanned vehicles 102 into the first group 108 of transmitting unmanned vehicles 102a, 102b and the second group of receiving unmanned vehicles 102c, 102d based on at least the relative positions of the unmanned vehicles 102 and the predetermined direction 218. The control unit 204 of the unmanned vehicle 102a may also calculate desired distances and relative orientations between each of the unmanned vehicles 102 such that the first group 108 of transmitting unmanned vehicles 102a, 102b can form a phased-array transmitter, and the second group of receiving unmanned vehicles 102c, 102d can form a phased-array receiver. Additionally, any permutation of sub-clusters of any of these formations can be formed based on one or more common objectives. For example, in a formation of 8 unmanned vehicles, at least 2 unmanned vehicles 102 will necessarily be required to beam form, while at least 1 unmanned vehicle 102 will be required to receive a given signal during a transmit/receive mission. This means that, for example, (8 choose 2) through (8 choose 7)=246 possible combinations are possible, all of which are envisioned in various embodiments. Of course, the number of unmanned vehicles 102 is not limited to 8 and could in practice be any number whatsoever. Some embodiments in which each unmanned vehicle 102 transmits and/or receives are also envisioned.

The communication units 202 of the companion unmanned vehicles 102b, 102c and 102d may receive signals indicative of the desired distances and relative orientations from the unmanned vehicle 102a. The control units 202 may then control the movements of the corresponding unmanned vehicles 102 and position them appropriately based on the desired distances and relative orientations in order to form the phased-array transmitter and phased-array receiver.

In an alternative embodiment, instead of the unmanned vehicle 102a, the base station 104 may be designated as the central platform. The base station 104 may receive signals from the unmanned vehicles 102 indicative of their respective positions. The base station 104 may then divide the unmanned vehicles 102 into the first group 108 and the second group 110. Further, the base station 104 may determine the desired distances and relative orientations required to form the phased-array transmitter and the phased-array receiver. The base station 104 may then communicate the desired distances and relative orientations to the respective unmanned vehicles 102.

The phased-array transmitter, formed by the transmitting elements (for example, the antennas 208) of the transmitting unmanned vehicles 102a, 102b, is an antenna array that emits a directional radiation pattern. This can be accomplished using directional antennas that are additive between the transmitting unmanned vehicles 102, or could also include isotropically radiating antennas that perform the same task. The process of combining signals in an antenna array to obtain a directional radiation pattern is known as beamforming or beam steering. Beamforming involves reinforcing signals from the antennas 208 of the transmitting unmanned vehicles 102a, 102b in the predetermined direction 218 by constructive interference at one or more points. A frequency, an amplitude, and/or a phase of the signals from each antenna 108 of the transmitting unmanned vehicles 102a, 102b may be modulated to obtain the desired constructive interference. Such modulation of the signals may be carried out by the signal units 206 based on control signals from the respective control units 204.

Further, relative positions of the transmitting unmanned vehicles 102a, 102b may also be varied in additional to modulating the signals. As a result of beamforming, the phased-array transmitter emits the transmission beam 220 towards the object 106 in the predetermined direction 218. Additionally, as each of the elements in the system 100 is in direct or indirect communication with each other, the directed energy beam can be continuously steered as an unmanned vehicle swarm (aerial or otherwise) traverses an objective. Additionally, of course, a directional beam could maintain its relative position with respect to the swarm (for example, in an application where terrain is being continuously surveyed). Additionally, sub-clusters can assume separate tasks anywhere in between, such as a first sub-cluster continuously scanning an area (coarse) with a relatively fixed beam while a second sub-cluster performs beam steering operations (fine, possibly at a second frequency) to hone in on flagged objects in the terrain.

The receiving elements (for example, the antennas 208) of the receiving unmanned vehicles 102c, 102d can form one or more receivers that can receive reflected signals resulting from the transmission beam 220. Specifically, the receiver(s) can receive reflected signals from the object 106, or from any other source (such as the base station 104). The receiving elements may receive signals isotropically (such as may be desired in terrestrial communications/control applications where a signal source is unpredictable or changes unexpectedly), or could behave as phased-array receivers.

Similar to the phased-array transmitter, the phased-array receiver receives signals emitted from a specific direction. The signal units 206 of the receiving unmanned vehicles 102c, 102d, may modulate a frequency, an amplitude, and/or a phase of the signals received by the respective antennas 208 based on control signals from the respective control units 204. Further, relative positions of the receiving unmanned vehicles 102c, 102d may also be varied in additional to modulating the received signals. The received signals from the unmanned vehicles 102c, 102d may be then combined by the central platform (the unmanned vehicle 102a in the illustrated embodiment) to obtained a desired pattern of reflected signals resulting from the transmission beam 220. It may also be contemplated that instead of the two receiving unmanned vehicles 102c and 102d, a single receiving unmanned vehicle having one or more antennas 208 can be used as a phased-array receiver. Modulation of the signals received by the single receiving unmanned vehicle can be performed accordingly.

In accordance with some embodiments, signals provided by the phased-array transmitter and received by the (possibly phased-array) receiver may be formed by repeated or iterative calculations. For example, the frequencies, phases and/or amplitudes of the transmitted signals, and the relative positions of the unmanned vehicles 102 can be iteratively changed over time to obtain the desired radiation pattern. The central platform can implement various control strategies, such as, but is not restricted to, open-loop control, closed-loop control, and the like, for carrying out the iterations.

In some embodiments, the unmanned vehicles 102c and 102d are positioned such that the respective antennas 208 do not receive the transmission beam 220. Specifically, the respective control units 204 position the receiving unmanned vehicles 102c and 102d relative to the transmitting unmanned vehicles 102a and 102b such that the respective antennas 208 are spatially clear of a path of the transmission beam 220. The central platform may calculate the path of the transmission beam 220 based on the positions of the transmitting unmanned vehicles 102a and 102b, and the predetermined direction 218. The central platform may communicate the path of the transmission beam 220 to the control units 204 of the receiving unmanned vehicles 102c and 102d. In an exemplary formation of the unmanned vehicles 102, the transmission beam 220 can be directed towards one side of the transmitting unmanned vehicles 102a and 102b, while the receiving unmanned vehicles 102c and 102d may be positioned on the opposite side of the transmitting unmanned vehicles 102c and 102d. Therefore, the receiving unmanned vehicles 102c and 102d may not directly receive the transmitted signals but only the reflected signals from the object 106, thereby improving Signal-to-Noise Ratio (SNR) of the received signals.

In accordance with some embodiments, the central platform can process the signals received by the receiving unmanned vehicles 102c and 102d, and detect the object 106. Further, the central platform can determine the position of the object 106 based on the received signals. In case the object 106 is mobile (e.g., a terrestrial vehicle, an aerial vehicle or a watercraft), the central platform can determine that the object 106 is mobile and control movements of the unmanned vehicles 102 to enable tracking of the object 106. The central platform may track the movement of the object 106 based on one or more parameters of the received signals. The one or more parameters may include, but is not restricted to, Signal-to-Noise Ratio (SNR), Signal-to-Interference Ratio (SIR), or other similar parameters.

In a further embodiment, the central platform can rearrange the grouping of the unmanned vehicles 102 in order to ensure reliable tracking of the object 106. For example, the central platform may designate the first group 108 containing the unmanned vehicles 102a and 102b as the receiving unmanned vehicles, while the second group 110 containing the unmanned vehicles 102c and 102d may be designated as the transmitting unmanned vehicles. Further, the central platform can vary the relative positions of the unmanned vehicles 102 based on the movement of the object 106. The phases, amplitudes and/or frequencies of the transmitted and received signals may be modified accordingly. Therefore, the predetermined direction 218 of the transmission beam 220 is changed based on the movement of the object 106. Information regarding the movement of the object 106 can also be communicated with the base station 104.

Though the above embodiments describe detection and tracking of a single object 106, the system 100 of unmanned vehicles 102 can also simultaneously detect and track multiple objects. The number of unmanned vehicles 102 may be varied based on the number of objects. Further, the unmanned vehicles 102 may be divided into groups such that each group tracks one of the objects.

In certain embodiments, the system 100 of unmanned vehicles 102 can form a collaborative swarm radar to determine an orientation, a relative distance, and/or a velocity of the object 106. The unmanned vehicles 102 can autonomously form such a swarm radar with one of the unmanned vehicles 102 acting as the central platform. With reference to the embodiment shown in FIGS. 1 and 2, the transmitting unmanned vehicles 102a and 102b may transmit radio waves, microwaves or any suitable electromagnetic waves towards the object 106, while the receiving unmanned vehicles 102c and 102d receive the reflected waves from the object 106. Beamforming can be used to improve Signal-to-Noise Ratio (SNR) of the received waves.

In other embodiments, the system 100 can perform high precision positioning and maneuvering by using a combination of short wavelengths and the satellite based positioning systems in the position units 210 of the respective unmanned vehicles 102. Such high precision and maneuvering can be used in land vehicles, aircrafts and watercrafts.

In addition to tracking, the system 100 of unmanned vehicles 102 can also perform various analyses. In some embodiments, the system 100 of unmanned vehicles 102 can generate holographic images of the object 106, a terrestrial region or an atmospheric region. The transmitting unmanned vehicles 102a and 102b can use beamforming to transmit a laser beam towards the object 106 or the region of interest. The receiving unmanned vehicles 102c and 102d can generate holographic images by detecting an interference pattern of the laser beam and imprinting the interference pattern on a recording unit (not shown). The interference pattern is encoded and require a light source (not shown), such as laser, in order to view its content.

In other embodiments, the system 100 of unmanned vehicles 102 can perform dimensional analyses of one or more objects or a region. Dimensional analyses can include computation of distances between two or more objects, detecting breaches in a geographic or artificial feature (e.g., a wall) or calculating an area of the region of interest. The unmanned vehicles 102 can be used to determine positions of each object or multiple sections of the region. The central platform can then perform dimensional analyses based on the positions of the individual objects or sections.

In accordance with some embodiments, the system 100 of unmanned vehicles 102 can perform excitation and/or sensing of atmospheric, terrestrial or marine regions. In some embodiments, the system 100 may use beamforming and Doppler effect for excitation and sensing of the regions. The transmitting unmanned vehicles 102a and 102b can transmit appropriate signals to excite the atmospheric, terrestrial or marine regions. The receiving unmanned vehicles 102c and 102d can be used to receive radiation reflected or scattered by the regions. The signals received by the receiving unmanned vehicles 102c and 102d can be processed to perform sensing, analyses and data collection of the regions. Such analyses can include, for example, terrain mapping, estimating crop yield, determining snow accumulation, studying traffic patterns, measuring pollution etc.

In further embodiments, the system 100 of unmanned vehicles 102 can perform organic penetration sensing to detect and analyze hidden objects or regions, for example, subterranean features, underwater features, regions covered by dense foliage etc. The transmitting unmanned vehicles 102a and 102b can transmit signals of appropriate frequencies (for example, submillimeter or millimeter wave frequencies) that can penetrate organic matter without causing any damage. The receiving unmanned vehicles 102c and 102d can receive the reflected signals from the hidden objects or regions for further processing and analyses.

Though the embodiment of system 100 shown in FIGS. 1 and 2 includes the first group 108 of transmitting unmanned vehicles 102a and 102b, and the second group 110 of receiving unmanned vehicles 102c and 102d, some embodiments can include multiple groups of transmitting unmanned vehicles and/or receiving unmanned vehicles, as described in more detail below.

IV. Detection of Non-Linear Elements

Figure 3:
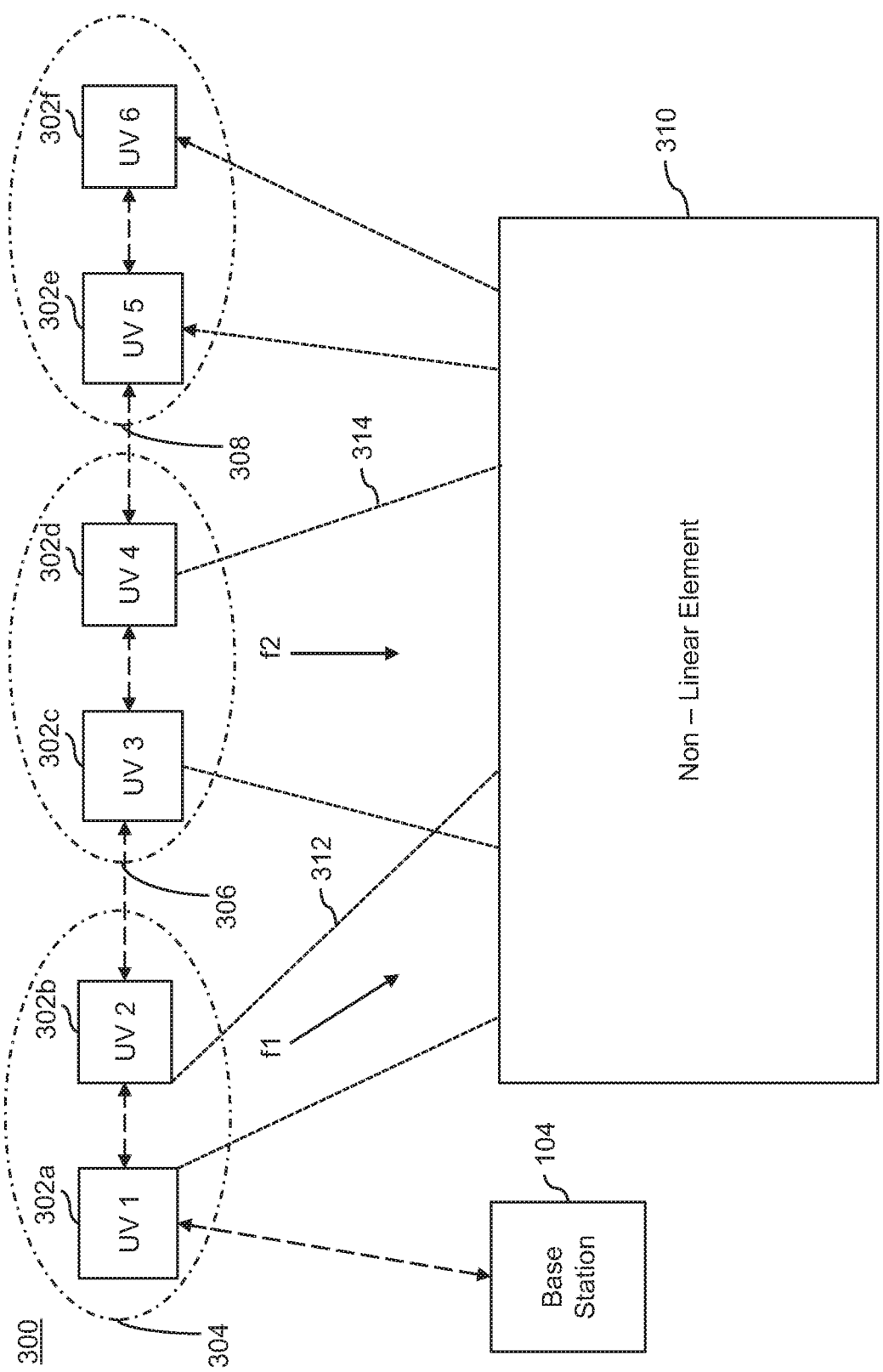
FIG. 3 is a schematic of an alternative system of unmanned vehicles in accordance with the disclosed subject matter.

FIG. 3 is a schematic of a system 300 for transmitting and receiving signals in accordance with the disclosed subject matter. The system 300 includes unmanned vehicles 302a, 302b, 302c, 302d, 302e and 302f hereinafter collectively referred to as an unmanned vehicle 302. The unmanned vehicles 302 are divided into a first cluster 304 of transmitting unmanned vehicles 302a and 302b and a second cluster 306 of transmitting unmanned vehicles 302c and 302d, and a third cluster 308 of receiving unmanned vehicles 302e and 302f. However, in alternative embodiments, the system 300 may include a single receiving unmanned vehicle. One of the unmanned vehicles 302 or the base station 104 may act as the central platform. Further, the unmanned vehicle 302a may communicate with the base station 104 on behalf of all the unmanned vehicles 302.

The system 300 can detect and track a non-linear element 310. The non-linear element 310 can be any element that modifies frequencies of signals incident on it. The non-linear element 310 may generate frequencies that can be a sum, difference, product, and other combinations of the incident frequencies. Examples of the non-linear element 310 include cell phone transceivers, laptops, wireless modems, walkie-talkies, or any device that includes a transistor, a diode or any other semiconductor component.

In the illustrated embodiment, the first cluster 304 of transmitting unmanned vehicles 302a and 302b emit a first transmission beam 312 at a first frequency 'f1' towards the non-linear element 310. Similarly, the second cluster 306 of transmitting unmanned vehicles 302c and 302d emit a second transmission beam 314 at a second frequency 'f2' towards the non-linear element 310. The first transmission beam 312 and second transmission beams 314 may be generated by beamforming. Therefore, the transmitting vehicles 302a and 302b form a first phased-array transmitter, while the transmitting vehicles 302c and 302d form a second phased-array transmitter. The first and second frequencies 'f1', 'f2' may lie in a very high frequency range. Further, a difference between the first and second frequencies 'f1', 'f2' may be low as compared to their frequency values. In an example, the first frequency 'f1' and the second frequency 'f2' can be about 300 MHz and 310 MHz, respectively.

The third cluster 308 of receiving unmanned vehicles 302e and 302f can receive the signals generated by the non-linear element 310 in response to stimulation by the first and second transmission beams 312, 314. The receiving unmanned vehicles 302e and 302f may form a phased-array receiver that can detect one or more modifications of the first and second frequencies 'f1' and 'f2'. The receiving unmanned vehicles 302e and 302f can also be positioned such that they do not directly receive the first and second transmission beams 312, 314, thereby improving Signal-to-Noise Ratio (SNR) of the received signals. In some embodiment, the receiving unmanned vehicles 302e and 302f can be used to detect a difference between the first and second frequencies 'f1' and 'f2'. Specifically, the signals received by each of the unmanned vehicles 302e and 302f may be passed through a low-pass filter to detect the difference between the first and second frequencies 'f1' and 'f2'. In the present example, the receiving vehicles 302e and 302f are used to detect about 10 MHz. Therefore, if the receiving unmanned vehicles 302e and 302f receive signals of a frequency of about 10 MHz, the non-linear element 310 is detected.

In addition to detection of the non-linear element 310, the system 300 can determine a position of the non-linear element 310 based on a combination of ranging tones that could be embedded in f1 and/or f2, or simply by calculating the receive time of the signal amongst multiple transmitters to triangulate its position and distance. Combinations of these approaches can also be employed; thus, a response is similar to a detectable echo that arrives at different times in different places and thus can be geolocated.

Moreover, the system 300 can track the non-linear element 310 if it is mobile. As mentioned above, in some embodiments, the signals transmitted by the first cluster 304 of unmanned transmitting vehicles 302a and 302b can be modulated to include ranging tones such as maximal or Gold codes. Similarly, the signals transmitted by the second cluster 306 of unmanned transmitting vehicles 302c and 302d can also be modulated to include ranging tones. The ranging tones can be encoded in the transmitted signals by various modulating strategies, such as amplitude modulation, frequency modulation, and the like.

The receiving unmanned vehicles 302e and 302f can receive the reflected signals from the non-linear element 302 and detect the ranging tones associated with the first and second frequencies 'f1', 'f2'. Since, the receiving unmanned vehicles 302e and 302f are at different positions, they receive the reflected/modulated signals associated with the first and second frequencies 'f1', 'f2' at different times. The receiving unmanned vehicles 302e and 302f can therefore be used to triangulate the position of the mobile non-linear element 310 based on a difference in times between detection of the ranging tones, and a distance between the receiving unmanned vehicles 302e and 302f for the non-stationary target. In alternative embodiments, three receiving unmanned vehicles 302e-g may be used for greater accuracy of the triangulation process. Of course, additional receiving unmanned vehicles 302n may be employed for even greater accuracy. In addition to the detection and geo-spatial location of the received signals, differential algorithms can be employed to monitor the changes in the received signal timing, intensity or frequency from each of the receiving unmanned vehicles 302n to perform active, real-time tracking of mobile targets.

In some embodiments, the system 300 can be of use to entities such as law enforcement, which could use the non-linear detection and triangulation process to accurately track the non-linear element 310 in case it is mobile. Exemplary applications include system(s) 300 that can be used to identify and track a vehicle containing a non-linear device such as a laptop or a cell phone carried by a suspect.

One important feature of this process is that the non-linear element 310 need NOT be powered on. The reason for this is because nonlinear devices such as transistors and diodes naturally perform frequency modulation provided sufficient input power. Although a commercial device (such as a cell phone) provides this power from a battery, an external radiative source can also by itself provide sufficient power to "turn on" the non-linearity and cause the non-linearity to produce intermodulation between incoming radiative signals. This principle is aided by the fact that antennas in cell phones, Wi-Fi adapters, etc. are specifically designed to couple radiation into the front end transceiver of the non-linear element 310, which necessarily contains non-linear devices. These front end transceiver non-linear devices aid in the sampling and down conversion of the incoming signals, but can additionally perform the desired signal intermodulation. Additionally, an examination of the transmitted and subsequently modulated signals can provide an indication of the operational frequency band or bandwidth of the nonlinear element 310.

In certain embodiments, the system 300 can perform electronic countermeasures on the non-linear element 310, often based on the detected operational frequency band or bandwidth of the non-linear element 310. In an example, the system 300 may determine that the non-linear element 310 is a threat, such as a detonator of an Improvised Explosive Device (IED), an enemy vehicle having a radar system etc. Once the receiving unmanned vehicles 302e and 302f have determined one or more frequencies of the signals emitted by the non-linear element 310, the transmitting unmanned vehicles 302a-302d may then transmit signals at the same or similar frequencies used by the non-linear element 310 in order to jam the non-linear element 310 from further use. In furtherance of this objective, the transmitting unmanned vehicles 302a-302d may use beamforming to form a phased-array transmitter of relatively high-power while employing only relatively low-power individual transmitters per unmanned vehicle 302a-d in order to achieve a required jamming power. The phased-array transmitter could them emit a transmission beam towards the triangulated position of the non-linear element 310 and perform jamming. In some embodiments, all the unmanned vehicles 302a-302f of the system 300 may form a phased-array transmitter to perform a jamming operation. Therefore, beamforming may enable individual unmanned vehicles having relatively low power output to collectively form a phased-array transmitter that emits a transmission beam having sufficient strength to achieve jamming at a desired location.

V. Electronic Countermeasures and Non-Lethal Deterrents

Figure 4:
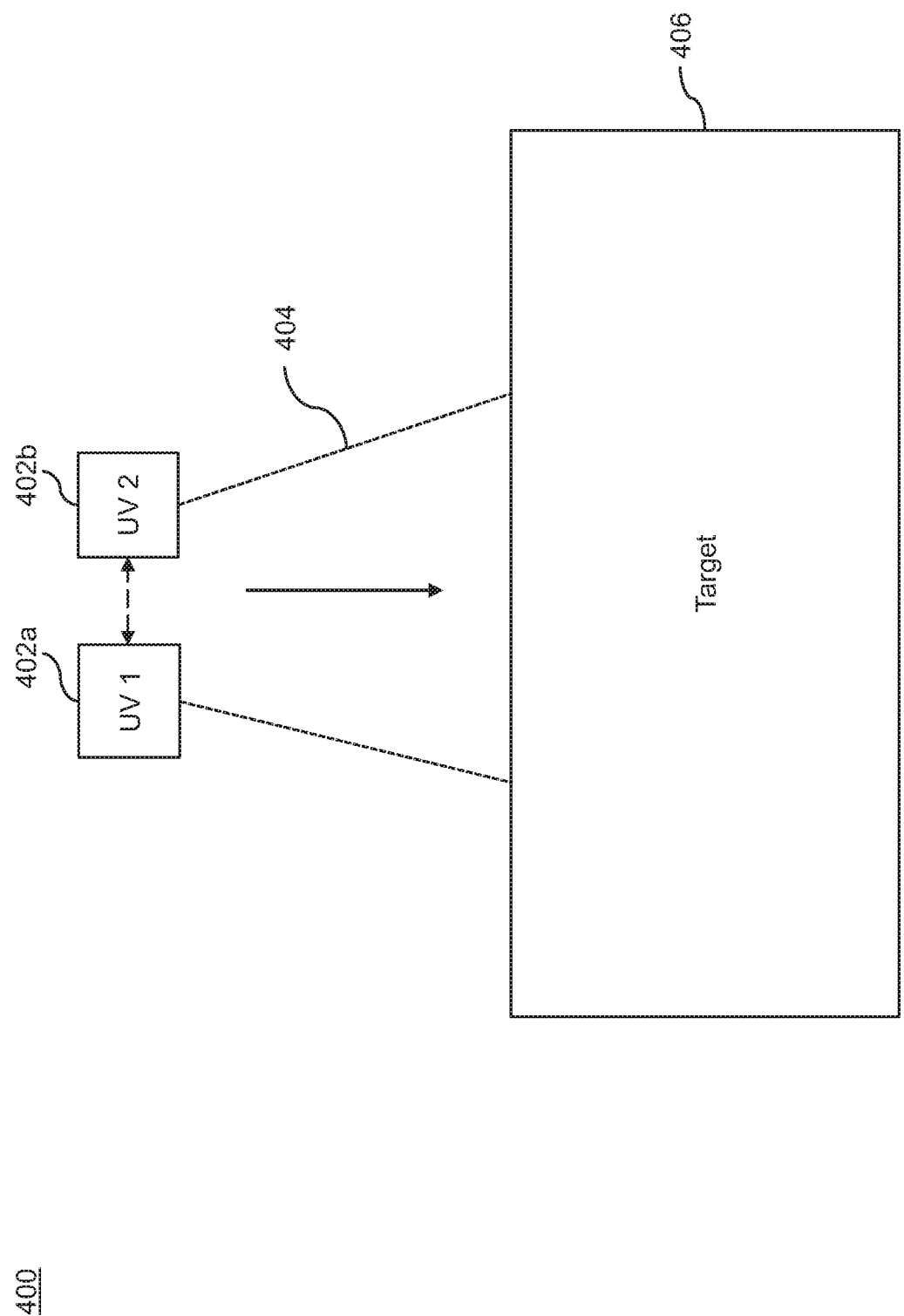
FIG. 4 is a schematic of another alternative system of unmanned vehicles in accordance with the disclosed subject matter.

FIG. 4 is a schematic of a system 400 in accordance with the disclosed subject matter. The system 400 includes unmanned vehicles 402a and 402b, hereinafter collectively referred to as an unmanned vehicle 402. Though two unmanned vehicles 402 are illustrated FIG. 4, the system 400 can include any suitable number of unmanned vehicles 402. The unmanned vehicles 402 can form a phased-array transmitter and emit a transmission beam 404 towards a target 406. The target 406 can be an organism or a collection of organisms. Examples of such organism may include, but is not restricted to, humans, animals, insects, birds etc. In an embodiment, the transmission beam may be microwaves that provide a non-lethal deterrence to the target 406 by causing the heating of a skin surface. This may cause the target 406 to flee from an area without resulting in any permanent injury. In another embodiment, the transmission beam may be in an ultrasonic range that may cause discomfort to the target 406. In some embodiments, the system 400 can be used to prevent trespassing of a secured area. In yet other embodiments, the system 400 can be used for pest control. In some embodiments, the transmission beam 404 can form a plane or other structure that can sweep across geographic regions such as conflict regions, parasite ridden areas, etc.

VI. Terrestrial Satellite Applications

Figure 5:
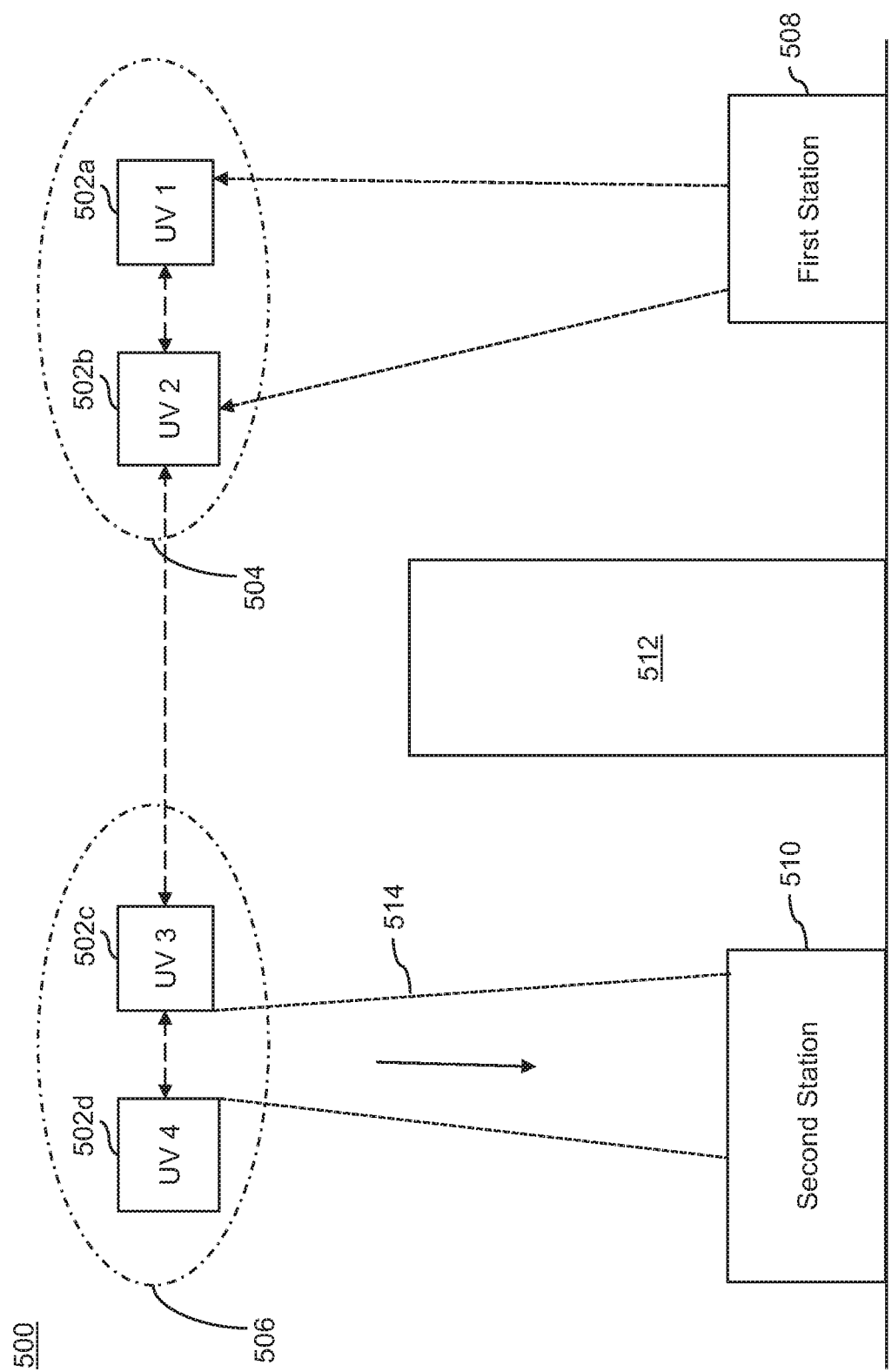
FIG. 5 is a schematic of yet another alternative system of unmanned vehicles in accordance with the disclosed subject matter.

FIG. 5 is a schematic of a system 500 in accordance with principles of the disclosed subject matter. The system 500 includes the unmanned vehicles 502a, 502b, 502c and 502d, hereinafter collectively referred to as an unmanned vehicle 502. Though four unmanned vehicles 502 are illustrated FIG. 5, the system 500 can include any suitable number of unmanned vehicles 502. In FIG. 5, the unmanned vehicles 502a, 502b are divided into a first group 504 of unmanned vehicles 502a and 502b, and a second group 506 of unmanned vehicles 502c and 502d. Both clusters of unmanned vehicles 502 can transmit and receive signals to and from their respective stations 508 and 510 as illustrated in FIG. 5. For example, the first station 508 can be a portable electronic device, such as a laptop, a cell phone, a walkie-talkie, a wearable device etc. Alternatively, the first station 508 can be any base station having communication equipment that can transmit signals to the receiving unmanned vehicles 502a and 502b. The second station 510 can also be a portable electronic device, such as a laptop, a cell phone, a walkie-talkie, a wearable device etc. Alternatively, the second station 510 can be any base station having communication equipment that can receive signals from the transmitting unmanned vehicles 502c and 502d. An obstruction 512 located between the first and second stations 508, 510 may inhibit direct communication between the first and second stations 508, 510. The obstruction 512 can be any geographic or manmade feature, such as a mountain, a skyscraper, and so forth. Alternatively, the first and second stations 508, 510 may be separated by a large distance that can hinder direct communication. Further, at least one of the first and second stations 508, 510 may be located in a remote area where any separate wireless network (e.g., cellular network) is absent.

In an embodiment, the first group 504 of receiving unmanned vehicles 502a and 502b use beamforming techniques to form a phased-array receiver that receives signals from the first station 508. The signals received by the first group 504 can be communicated with the second group 506. In a further embodiment, the second group 506 of transmitting unmanned vehicles 502c and 502d use beamforming techniques to form a phased-array transmitter that emits a transmission beam 514 towards the second station 510. The transmission beam 514 may include encoded signals that are transmitted by the first station 508. Therefore, the system 500 of unmanned vehicles 502 form a terrestrial satellite system that can enable wireless communication between the first and second stations 508, 510.

In some embodiments, the first group 504 may communicate the signals received from the first station 508 to a satellite (e.g., a bent pipe satellite) that relays the signals to the second group 506. The first group 504 of unmanned vehicles 502a, 502b may further use beamforming techniques to communicate with the satellite.

In some embodiments, only one group (say, second group 506) may be required. In this instance, second station 510 could comprise one or more users attempting to communicate with a remote destination such as a terrestrial base station (land or sea), satellite, or the like. In this instance, the (sole) second group 506 could relay short-distance signals to, say, a user who may be part of or in communication with second station 510, and then use a beamforming strategy to combine and transmit a higher-powered, wider bandwidth long range signal to the remote base station (terrestrial, land or sea, etc.) without the need to relay the signal through a second swarm group (say, group 504). In this way, second group 506 acts as an intermediary or terrestrial mobile satellite. Advantages of such an approach include the ability to selectively pinpoint areas in need of a communications link and reach them in a short period of time.

This strategy can also lend itself to numerous swarm formations. One such formation could be circular orbits in a diameter proportional to the region of demand. In some embodiments, a group (say, second group 506) could stagger altitudes while performing circular orbits. This could allow individual unmanned vehicles (say, 502c) to receive messages from second station 510 and re-transmit them to unmanned vehicles (say 502d) in higher orbits to overcome obstacles such as obstacle 512. Of course, this process could be repeated in reverse for the reception of messages to second station 510. All other permutations of the delegation of message transmission are also envisioned.

As described above, embodiments of the system 500 can use beamforming to perform short range satellite communication with terrestrial clients, such as, but not restricted to, a cell phone, a cellular tower, a terrestrial vehicle, and so forth. Additionally, or optionally, embodiments of the system 500 can use beamforming to perform long range satellite communication with satellites and base stations.

VII. Method of Controlling Unmanned Vehicles

Figure 6:
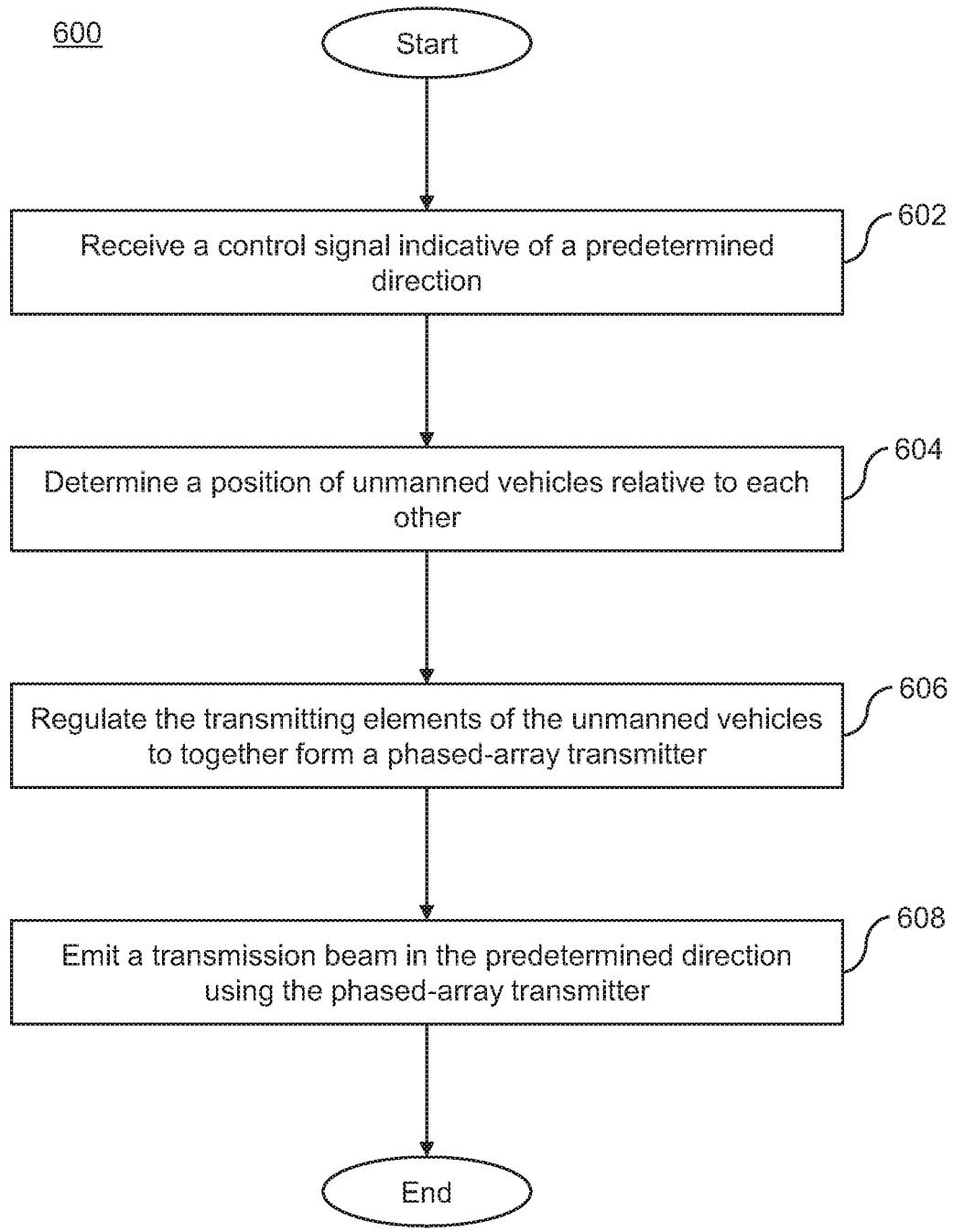
FIG. 6 is a flowchart of an exemplary procedure for controlling unmanned vehicles.

FIG. 6 is a flowchart of a procedure 600 for controlling unmanned vehicles in accordance with the disclosed subject matter. This flowchart is merely provided for exemplary purposes, and embodiments are intended to include or otherwise cover any methods or procedures for controlling unmanned vehicles.

The procedure 600 will be described hereinafter in conjunction with the system 100 illustrated in FIGS. 1 and 2. However, the procedure 600 can be implemented by any of the systems 300, 400 and 500. In accordance with the flowchart of FIG. 6, at step 602, at least one of the unmanned vehicles 102 receives a control signal indicative of the predetermined direction 218. In an embodiment, the unmanned vehicle 102a, that is designated as the central platform, receives the control signal from the base station 104. Further, the unmanned vehicle 102a can communicate the predetermined direction 218 to the companion unmanned vehicles 102b, 102c and 102d.

At step 604, the central platform determines positions of the unmanned vehicles 102 relative to each other. The positions can include, but not restricted to, distances and relative orientations between the unmanned vehicles 102.

At step 606, the control units 204 of the transmitting unmanned vehicles 102a and 102b regulate the corresponding transmitting elements (the antennas 208) to together form a phased-array transmitter. The phased-array transmitter can be formed by beamforming techniques. In an embodiment, frequencies, amplitudes and/or phases of the signals transmitted by the transmitting elements can be varied to form the phased-array transmitters. Additionally, or optionally, the control units 204 may move the transmitting unmanned vehicles 102a and 102b to suitably position the transmitting unmanned vehicles 102a and 102b relative to each other. Such positioning of the transmitting unmanned vehicles 102a and 102b may facilitate the formation of the phased-array transmitter.

At step 608, the control units 204 of the transmitting unmanned vehicles 102a and 102b controls the corresponding transmitting elements such that the phased-array formed by the transmitting elements emits the transmission beam 220 in the predetermined direction 218.

VIII. Computer System Associated with the Unmanned Vehicles

Figure 7:
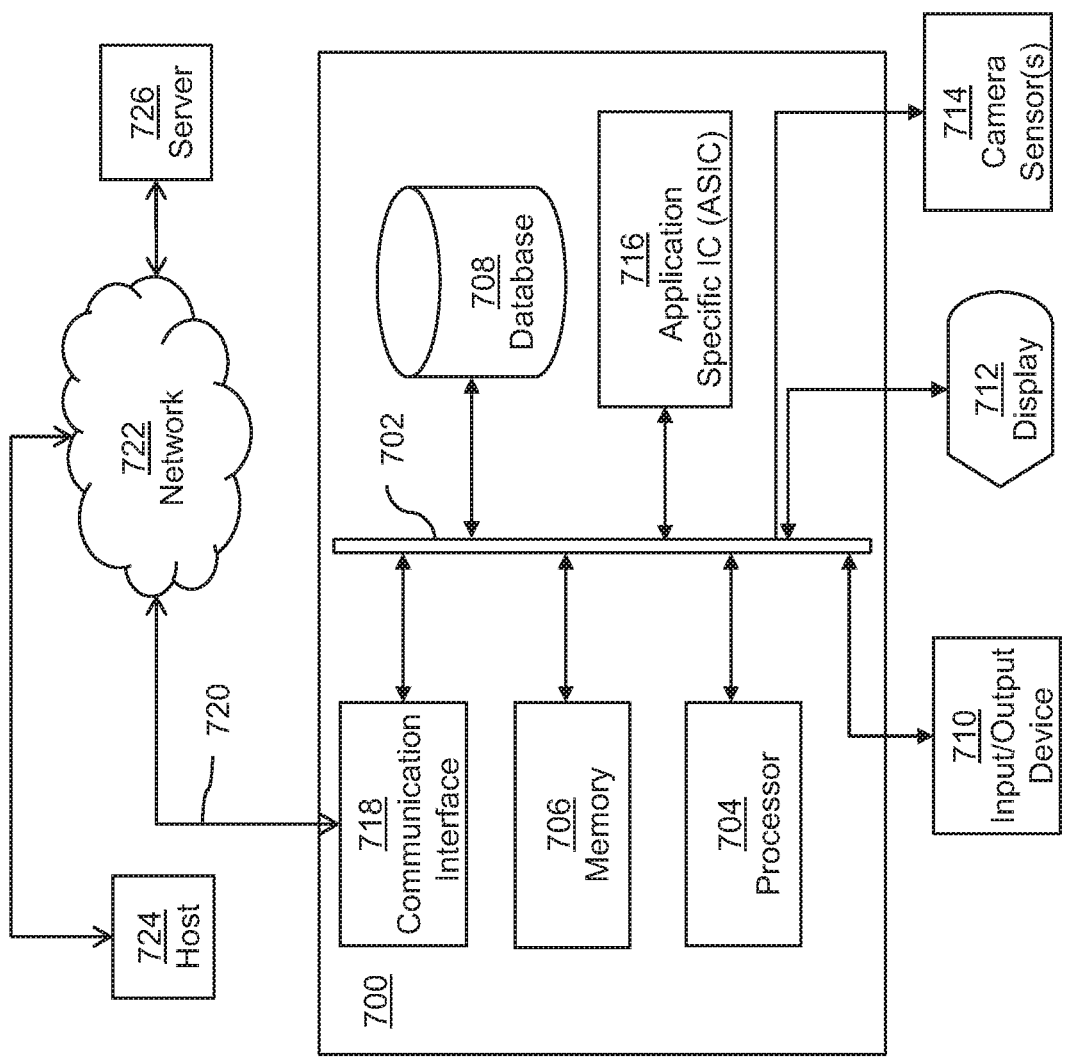
FIG. 7 is a computer system that can be used to implement various exemplary embodiments of the disclosed subject matter.

FIG. 7 illustrates a computer system 700 upon which an embodiment of the invention may be implemented. Although, the computer system 700 is depicted with respect to a particular device or equipment, it is contemplated that other devices or equipment (e.g., network elements, servers, etc.) within FIG. 7 can deploy the illustrated hardware and components of the system 700. The computer system 700 is programmed (e.g., via computer program code or instructions) to transmit and receive signals by using one or more unmanned vehicles described herein and includes a communication mechanism such as a bus 702 for passing information between other internal and external components of the computer system 700. Information (also called data) is represented as a physical expression of a measurable phenomenon, typically electric voltages or currents, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. The computer system 700, or a portion thereof, constitutes a means for performing one or more steps for transmitting and receiving signals by using one or more unmanned vehicles.

The bus 702 includes one or more parallel conductors of information so that information is transferred quickly among devices coupled to the bus 702. One or more processors 704 for processing information are coupled with the bus 702.

The processor (or multiple processors) 704 performs a set of operations on information as specified by computer program code related to transmission and reception of signals by using one or more unmanned vehicles. The computer program code is a set of instructions or statements providing instructions for the operation of the processor 704 and/or the computer system 700 to perform specified functions. The code, for example, may be written in a computer programming language that is compiled into a native instruction set of the processor 704. The code may also be written directly using the native instruction set (e.g., machine language). The set of operations include bringing information in from the bus 702 and placing information on the bus 702. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 704, such as a sequence of operation codes, constitute processor instructions, also called computer system instructions or, simply, computer instructions. The processors 704 may be implemented as mechanical, electrical, magnetic, optical, chemical, or quantum components, among others, alone or in combination.

The computer system 700 also includes a memory 706 coupled to the bus 702. The memory 706, such as a Random Access Memory (RAM) or any other dynamic storage device, stores information including processor instructions for storing information and instructions to be executed by the processor 704. The dynamic memory 706 allows information stored therein to be changed by the computer system 700. RAM allows a unit of information stored at a location called a memory address to be stored and retrieved independently of information at neighboring addresses. The memory 706 is also used by the processor 704 to store temporary values during execution of processor instructions. The computer system 700 also includes a Read Only Memory (ROM) or any other static storage device coupled to the bus 702 for storing static information, including instructions, that is not changed by the computer system 700. Some memory is composed of volatile storage that loses the information stored thereon when power is lost. Also coupled to the bus 702 is a non-volatile (persistent) storage device 708, such as a magnetic disk, a solid state disk, optical disk or flash card, for storing information, including instructions, that persists even when the computer system 700 is turned off or otherwise loses power. The storage device 708 can act as a database.

Information, including instructions for forming a phased-array transmitter or a phased-array receiver by using the unmanned vehicles is provided to the bus 702 for use by the processor 704 from an external input device 710, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in the computer system 700. Other external devices coupled to the bus 702, used primarily for interacting with humans, include a display 712, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and a pointing device 716, such as a mouse, a trackball, cursor direction keys, or a motion sensor, for controlling a position of a small cursor image presented on the display 712 and issuing commands associated with graphical elements presented on the display 712, and one or more camera sensors 714 for capturing, recording and causing to store one or more still and/or moving images (e.g., videos, movies, etc.) which also may comprise audio recordings. Further, the display 712 may be a touch enabled display such as capacitive or resistive screen. In some embodiments, for example, in embodiments in which the computer system 700 performs all functions automatically without human input, one or more of the external input device 710, and the display device 712 may be omitted.

In the illustrated embodiment, special purpose hardware, such as an ASIC 716, is coupled to the bus 702. The special purpose hardware is configured to perform operations not performed by the processor 704 quickly enough for special purposes. Examples of ASICs include graphics accelerator cards for generating images for the display 712, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 700 also includes one or more instances of a communication interface 718 coupled to the bus 702. The communication interface 718 provides a one-way or two-way communication coupling to a variety of external devices that operate with their own processors, such as printers, scanners and external disks. In general, the coupling is with a network link 720 that is connected to a local network 722 to which a variety of external devices with their own processors are connected. For example, the communication interface 718 may be a parallel port or a serial port or a Universal Serial Bus (USB) port on a personal computer. In some embodiments, the communication interface 718 is an Integrated Services Digital Network (ISDN) card, a Digital Subscriber Line (DSL) card, or a telephone modem that provides an information communication connection to a corresponding type of a telephone line. In some embodiments, the communication interface 718 is a cable modem that converts signals on the bus 702 into signals for a communication connection over a coaxial cable or into optical signals for a communication connection over a fiber optic cable. As another example, the communications interface 718 may be a Local Area Network (LAN) card to provide a data communication connection to a compatible LAN, such as Ethernet or an Asynchronous Transfer Mode (ATM) network. In one embodiment, wireless links may also be implemented. For wireless links, the communication interface 718 sends or receives or both sends and receives electrical, acoustic or electromagnetic signals, including infrared and optical signals that carry information streams, such as digital data. For example, in wireless handheld devices, such as mobile telephones like cell phones, the communication interface 718 includes a radio band electromagnetic transmitter and receiver called a radio transceiver. In certain embodiments, the communication interface 718 enables connection to the wireless network used by one or more unmanned vehicles. Further, the communication interface 718 can include peripheral interface devices, such as a thunderbolt interface, a Personal Computer Memory Card International Association (PCMCIA) interface, etc. Although a single communication interface 718 is depicted, multiple communication interfaces can also be employed.

The term "computer-readable medium" as used herein refers to any medium that participates in providing information to the processor 704, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 708. Volatile media include, for example, the dynamic memory 706. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 716.

The network link 720 typically provides information communication using transmission media through one or more networks to other devices that use or process the information. For example, the network link 720 may provide a connection through the local network 722 to a host computer 724 or to ISP equipment operated by an Internet Service Provider (ISP).

A computer called a server host 726, connected to the Internet, hosts a process that provides a service in response to information received over the Internet. For example, the server host 726 hosts a process that provides information representing video data for presentation at the display 712. It is contemplated that the components of the computer system 700 can be deployed in various configurations within other computer systems, e.g., the host 724 and the server 726.

At least some embodiments of the invention are related to the use of the computer system 700 for implementing some or all of the techniques described herein. According to one embodiment of the invention, those techniques are performed by the computer system 700 in response to the processor 704 executing one or more sequences of one or more processor instructions contained in the memory 706. Such instructions, also called computer instructions, software and program code, may be read into the memory 706 from another computer-readable medium such as the storage device 708 or the network link 720. Execution of the sequences of instructions contained in the memory 706 causes the processor 704 to perform one or more of the method steps described herein. In alternative embodiments, hardware, such as the ASIC 716, may be used in place of or in combination with software to implement the invention. Thus, embodiments of the invention are not limited to any specific combination of hardware and software, unless otherwise explicitly stated herein.

Various forms of computer readable media may be involved in carrying one or more sequence of instructions or data or both to the processor 704 for execution. For example, instructions and data may initially be carried on a magnetic disk of a remote computer such as the host 724. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 720. An infrared detector serving as the communication interface 718 receives the instructions and data carried in the infrared signal and places information representing the instructions and data onto the bus 702. The bus 702 carries the information to the memory 706 from which the processor 704 retrieves and executes the instructions using some of the data sent with the instructions. The instructions and data received in the memory 706 may optionally be stored on the storage device 708, either before or after execution by the processor 704.

IX. Alternative Embodiments

While certain embodiments of the invention are described above, and FIGS. 1-7 disclose the best mode for practicing the various inventive aspects, it should be understood that the invention can be embodied and configured in many different ways without departing from the spirit and scope of the invention.

For example, embodiments are disclosed above in the context of unmanned vehicles. However, embodiments are intended to include or otherwise cover any type of unmanned or optionally manned vehicles, including, an unmanned or optionally manned aerial vehicle, an unmanned or optionally manned terrestrial vehicle, a drone, a gyrocopter, etc. In fact, embodiments are intended to include or otherwise cover any configuration of the unmanned or optionally manned vehicles.

Exemplary embodiments are also intended to cover any additional or alternative components of the unmanned or optionally manned vehicles disclosed above. Exemplary embodiments are further intended to cover omission of any component of the unmanned or optionally manned vehicles disclosed above.

Exemplary embodiments are also intended to cover any beamforming techniques, for example, but not restricted to, phase modulation, amplitude modulation, and so forth. Embodiments are also intended to include or otherwise cover the usage of any suitable signals to achieve beamforming. Examples of such suitable signals include, but not restricted to, electromagnetic waves, acoustic waves, and so forth.

Exemplary embodiments are also intended to cover usage of beamforming in unmanned underwater vehicles, for example, in SONAR applications. Exemplary embodiments are also intended to cover usage of beamforming in unmanned space vehicles, for example, in radio astronomy.

Embodiments, as described above, use beamforming to combine multiple low powered unmanned or optionally manned vehicles to produce a large signal that can be directed in a desired direction. Certain embodiments also use beamforming to combine multiple unmanned or optionally manned vehicles to receive and process reflected signals from an object or a region for accurate detection, positioning and/or analyses.

Embodiments, as described above, can also improve Signal-to-Noise Ratio (SNR) of the signals received at the unmanned or optionally manned vehicles by adjusting the positions of the unmanned or optionally manned vehicles relative to each other. Specifically, the receiving unmanned or optionally manned vehicles can be positioned relative to the transmitting unmanned or optionally manned vehicles such that the receiving unmanned or optionally manned vehicles do not directly receive the transmission beam emitted by the transmitting unmanned or optionally manned vehicles.

Embodiments are also intended to include or otherwise cover the usage of beamforming by unmanned or optionally manned vehicles for parcel delivery applications. In parcel delivery applications, signals transmitted by a fleet of unmanned or optionally manned vehicles can be combined using beamforming techniques to enable high speed or ultra-broadband data transfer. Such combination of signals may allow higher frequencies (e.g., millimeter or sub-millimeter wave frequencies) to be used by each unmanned or optionally manned vehicle as beamforming causes constructive interference of the signals from the unmanned or optionally manned vehicles to provide high amplitudes of the resultant beam. High speed data transfer using beamforming can allow accurate positioning of the unmanned or optionally manned vehicles relative to each other as higher frequencies provide greater precision. Precise positioning of the unmanned or optionally manned vehicles can lead to improved accuracy of parcel deliveries. Further, precise position can result in faster responses to new or changing orders.

Embodiments are also intended to include or otherwise cover methods of manufacturing the unmanned or optionally manned vehicle disclosed above. The methods of manufacturing include or otherwise cover processors and computer programs implemented by processors used to design various elements of the unmanned or optionally manned vehicle disclosed above.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations of unmanned or optionally manned vehicles disclosed above.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A system for detecting and tracking a non-linear element by transmitting and receiving signals, comprising:
   a plurality of transmitting unmanned vehicles spaced from each other, the plurality of transmitting unmanned vehicles being divided into at least a first cluster and a second cluster of the plurality of transmitting unmanned vehicles, each of the plurality of transmitting unmanned vehicles including a transmitting element configured to transmit a signal towards a non-linear element, the transmitting elements of the first cluster of the plurality of transmitting unmanned vehicles together forming a first phased-array transmitter that emits a first transmission beam on a first frequency towards the non-linear element, and the transmitting elements of the second cluster of the plurality of transmitting unmanned vehicles together forming a second phased-array transmitter that emits a second transmission beam on a second frequency towards the non-linear element; and
   at least two receiving unmanned vehicles, each including:
      a receiving element configured to receive a third signal and a fourth signal generated by the non-linear element in response to stimulation by the first transmission beam and the second transmission beam; and
      a control unit in communication with at least one of the plurality of transmitting unmanned vehicles and another of said at least two receiving unmanned vehicles, wherein the control unit is configured to position the at least two receiving unmanned vehicles relative to the plurality of transmitting unmanned vehicles such that the receiving element is spatially clear of a path of the first transmission beam and the second transmission beam.

2. The system according to claim 1, further comprising a central platform including one of a base station and a first of the plurality of transmitting unmanned vehicles, wherein the central platform is configured to control movements of the plurality of transmitting unmanned vehicles such that the transmitting elements of the plurality of transmitting unmanned vehicles together form the first phased-array transmitter and the second phased-array transmitter.

3. The system according to claim 1, wherein the non-linear element modifies the first frequency and the second frequency incident on itself so that the non-linear element generates the third signal and the fourth signals, and wherein each of the third signal and the fourth signal is comprised of at least one of the sum, difference and other combinations of the first frequency and the second frequency.

4. The system according to claim 1, wherein each of the plurality of transmitting vehicles includes a control unit configured to control at least one of a phase, an amplitude and a frequency of the signal transmitted by the transmitting element.

5. The system according to claim 1, wherein the control unit is further configured to control at least one of a phase, an amplitude and a frequency of one of the third signal and the fourth signal received by the receiving element.

6. The system according to claim 1, wherein the non-linear elements include at least one of cell phone transceivers, laptops, wireless modems, walkie-talkies and an other device, and wherein the other device includes at least one of a transistor, diode and semiconductor component.

7. The system according to claim 1, wherein each of the third signal and the fourth signal received by each of said at least two receiving unmanned vehicles is passed through a low-pass filter to detect a difference between the first frequency and the second frequency.

8. The system according to claim 1, wherein the first frequency includes a first ranging tone and the second frequency includes a second ranging tone, and wherein said at least two unmanned vehicles receive one of a reflected and modified said first transmission beam emitted from the non-linear element, and one of a reflected and modified said second transmission beam emitted from the non-linear element, in order to at least one of determine a position of the non-linear element and track the non-linear element.

9. The system according to claim 1, wherein each of the plurality of transmitting unmanned vehicles and each of the at least two receiving unmanned vehicles includes at least one of the control unit, a communication unit, a signal unit and a position unit.

* * * * *